US010003971B2

(12) United States Patent
Sanders (10) Patent No.: US 10,003,971 B2
(45) Date of Patent: *Jun. 19, 2018

(54) COMPARTMENTALIZED MULTI-FACTOR AUTHENTICATION FOR MOBILE DEVICES

(71) Applicant: XEROX CORPORATION, Norwalk, CT (US)

(72) Inventor: Aaron Dale Sanders, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/196,799

(22) Filed: Jun. 29, 2016

(65) Prior Publication Data

US 2018/0007549 A1  Jan. 4, 2018

(51) Int. Cl.
*H04M 1/66* (2006.01)
*H04W 12/06* (2009.01)
*H04W 12/08* (2009.01)

(52) U.S. Cl.
CPC .......... *H04W 12/06* (2013.01); *H04W 12/08* (2013.01)

(58) Field of Classification Search
CPC .............................. H04W 12/06; H04W 12/08
USPC .......................... 455/411, 412.1, 550.1, 425
See application file for complete search history.

(56) References Cited

U.S. PATENT DOCUMENTS 5,559,961 A  9/1996 Blonder
7,647,036 B2  1/2010 Ornae et al.
8,910,274 B2 * 12/2014 Sanders ............ G06F 21/34
                                                        726/19
2004/0230843 A1  11/2004 Jansen
2007/0019215 A1  1/2007 Yu
2007/0277224 A1  11/2007 Osborn et al.
2008/0244700 A1  10/2008 Osborn et al.
2010/0043062 A1  2/2010 Alexander et al.
(Continued)

OTHER PUBLICATIONS

"QR codes for two-factor authentication", ConnectID, Nov. 22, 2005, pp. 1-4, retrieved from http://connectid.blogspot.com/2005/11/qr-codes-for-two-factor-authentication.html on Jan. 4, 2012.
(Continued)

*Primary Examiner* — Nghi H Ly
(74) *Attorney, Agent, or Firm* — MH2 Technology Law Group LLP (57) ABSTRACT

Techniques for obtaining compartmentalized authenticated access to a feature on an electronic mobile device comprising a camera are presented. The techniques may include obtaining data representing a printable authentication pattern, wherein the printable authentication pattern encodes access information, storing in electronic persistent memory the access information in association with data representing the feature, receiving, at the mobile telephone, a user request to access the feature, capturing, using a camera of the mobile device, an image of an input pattern printed on to a substrate, decoding the input pattern to obtain captured information, determining, by retrieving the access information, that the captured information matches the access information, and providing access to the feature on the mobile device as a consequence of at least the determining.

12 Claims, 7 Drawing Sheets

(56) References Cited

U.S. PATENT DOCUMENTS

2013/0031623 A1* 1/2013 Sanders ................. G06F 21/34
726/19

OTHER PUBLICATIONS

Liao and Lee, "A Novel User Authentication Scheme Based on QR-Code", Journal of Networks, vol. 5, No. 8, Aug. 2010, pp. 937-941.
Dodson et al., "Snap2Pass: Consumer Friendly Challenge-Response Authentication with a Phone", retrieved from http:/prpl. stanford. edu/papers/soups10j. pdf, 2010, pp. 1-12.

* cited by examiner

COMPARTMENTALIZED MULTI-FACTOR AUTHENTICATION FOR MOBILE DEVICES

FIELD

This disclosure relates generally to authenticated protection for data and applications on a mobile device.

BACKGROUND

I. Smartphone Background

Smartphones are basically small, handheld computers. For example, some smartphones permit a user to check email, open remote desktop sessions, use a remote client, and even install a version of the CISCO ANYCONNECT client. A modern smartphone may have, for example, eight core processors, 4 GB of RAM, the ability to accept 2 TB SD cards, and the ability to be cloud-connected.

Employers and employees have been increasingly relying on smartphones over traditional full-size or laptop computers. On the road, employees may use their smartphones like a mobile computer, and at the office, employees may continue to use their mobile devices for work purposes. This is furthered by technology that allows smartphones to alter their user interface based on available hardware. For example, if such a smartphone is used like a phone, it will display a standard touch-friendly user interface; whereas if a monitor and/or keyboard and mouse are plugged into the smartphone, it may replace the user interface with a more desktop-like interface that can leverage the additional hardware. Thus, employees may, at work, connect a smartphone to a monitor, keyboard and mouse for a full computing experience. At home, employees may do the same, and may additionally connect the smartphone to a virtual private network (VPN) into their computing environment, e.g., to access internally hosted applications and data.

Increasingly, data that was traditionally stored locally on laptops and desktops is now being stored on smartphones or accessed from remote cloud locations by smartphones. A number of companies are even replacing laptops with smartphones for their mobile workforce. Such companies reason that giving an employee a bulky laptop to carry around, or even a tablet, is less preferable than giving them a smartphone that has similar functionality, can fit easily in their pocket, and can still store and access necessary business data and applications.

Furthermore, smartphones are increasingly being used as primary computing devices. Populations of developing nations appear to be skipping personal computers and laptops completely, and going straight to the use of mobile devices, which are far more affordable and have greater availability. Even in the U.S., 7% of adults get internet access only from their smartphones, and 34% of adults get most of their Internet access from their smartphones.

Employers are following a parallel trend by increasingly implementing Bring Your Own Device (BYOD) policies. Such policies allow employees to bring their personal devices such as smartphones to work (and/or connect their personal devices to work systems) and use such devices to access private company data and applications. Companies are increasingly supporting BYOD as a strategy to shift the cost of information technology asset purchase and maintenance to their employees. It is estimated that by 2017, half of employers will require employees to supply their own compute devices for work purposes. One important consequence of BYOD policies is that when a device is used for personal and business activities, there is much greater risk of exposing private business data and applications.

In fact, smartphones are often lost or stolen. In 2013, for example, it is estimated that 1.4 million smartphones were lost, and between one million and 3.1 million were stolen. BYOD devices are at a particularly higher risk of being lost or stolen, because they are typically carried to many more locations and used for many more purposes that they would be otherwise.

In sum, smartphones are powerful devices with access to business data and applications; smartphones are increasingly used as the primary computing devices; smartphones are increasingly used for dual purposes (business and personal), and incidents of smartphone theft and loss are increasing every year. Moreover, the problem of lost and stolen devices is becoming more critical due to the purposes smartphones are used for and the data they contain and access.

II. Multi-Factor Authentication Background

As the use of handheld electronic devices to store and operate on personal and business data becomes increasingly more prevalent, the need for securing such devices with robust authentication mechanisms to prevent unauthorized entry and access has also increased. Traditionally, the primary means for securing handheld devices, such as smartphones, has been to require a user to enter a password in order to gain entry to the device. When used as the sole means for granting or denying access, a password-only approach may be considered a "single-factor" authentication scheme.

Single-factor authentication, however, may offer only modest protection against unauthorized access, since it may be necessary to obtain access to only a single authentication credential or object for a malicious user to gain access to the protected data or services. For example, if a smartphone is secured only by a password, then an unauthorized user need only obtain the password in order to gain entry to the smartphone. To address this weakness in single-factor authentication schemes, multi-factor authentication schemes have been devised where a user must demonstrate a right to entry using two or more separate mechanisms.

One example of a multi-factor authentication scheme is the use of a physical security token in conjunction with a password. For example, in order to gain access to a computer system, in addition to supplying a valid password, a user may also present a security badge having a magnetic strip or a radio frequency identification (RFID) tag for scanning. Such a token-based multi-factor authentication scheme provides an additional layer of security, since an unauthorized user would not be able to gain access to the system simply by obtaining knowledge of a valid password (e.g., by glancing over an authorized user's shoulder as he or she typed the password), but would also have to obtain possession of the token associated with the password in order to gain access.

Although token-based multi-factor authentication schemes provide an additional layer of security over single-factor authentication schemes such as purely password-driven systems, they suffer from a number of drawbacks. For example, a security token may be stolen by an unauthorized user or may be misplaced or forgotten by an authorized user, thus preventing the authorized user from being able to gain access. Moreover, because most computers and handheld devices lack native hardware support to detect the presence of a security token, such as a magnetic strip card reader or an RFID token scanner, it is usually necessary to install separate hardware peripheral devices in order to detect presentation of a valid physical security token.

One technique that has been devised to address several flaws in token-based multi-factor authentication schemes is to use biometric information in conjunction with a second authentication factor, such as a password. In a biometric multi-factor authentication scheme, in addition to providing a valid password, a person may also be required to demonstrate that he or she is the authorized holder of the password by providing a fingerprint, retinal scan, or other biometric information sufficient to determine biological identity. Biometric multi-factor authentication schemes have an advantage over token-based multi-factor authentication schemes in that, unlike a physical security token, biometric information may not be stolen or lost by an authorized user.

However, like token-based multi-factor authentication schemes, biometric multi-factor authentication schemes also suffer from the drawback that it is often necessary to purchase and install separate peripheral hardware devices, such as fingerprint readers or retina scanners, in order to authenticate using these techniques. Not only may such peripheral devices be expensive, but their necessity prevents users from implementing biometric scanning security mechanisms using only software upgrades to existing hardware configurations.

The situation may be slightly improved using some forms of biometric scanning, such as speech recognition and facial recognition, that, in some cases, may be able to use existing hardware configurations and rely only on software upgrades to determine biological identity. However, these forms of biometric scanning, even when implemented purely by software, also suffer from a number of drawbacks. For example, the size and complexity of software needed to perform facial or speech recognition is often immense, placing large burdens on memory and processing power that may not be appropriate for or supported by simpler or smaller computing devices such as mobile telephones and smartphones.

Robust and accurate speech or facial recognition software packages may also be prohibitively expensive and complex, making it commercially infeasible to incorporate such software into consumer devices that are intended for mass distribution at significantly cheaper prices. Moreover, because of the innumerable complexities involved in analyzing audio data representing a human voice or image data recognizing a human face, even high-end speech and facial recognition programs are often inaccurate, leading to security-vulnerable false positives or user-frustrating false negatives. For example, such analysis may be unduly sensitive to minor variations in lighting, background noise, varying vocal intonations, etc.

Therefore, there is a need for implementing multi-factor authentication in mobile devices, such as smartphones and other computers, that are able to utilize existing hardware to detect the presence of a valid physical security token using a simple software upgrade that is significantly more accurate than biometric scanning techniques and imposes a significantly lower processing and memory burden. Such a security token should also be capable of easy generation and replication using general purpose hardware and software already commercially available to users.

III. Barcode Background

As used herein, the term "barcode" means an optically-machine-readable graphical pattern that encodes information. Examples of barcodes include traditional (linear or one-dimensional) barcodes that encode information in modulations of widths and spacings of black line segments against a white background. Other barcodes include two-dimensional quality response (QR) codes, which encode information in two-dimensional patterns.

Commercial barcode scanners are configured to project laser light onto a physical surface (on which is printed a barcode) in order to analyze the light as it is reflected off of the physical surface back into optical sensors resident in the barcode scanner. Hardware in such barcode scanners may analyze the reflected light to measure spacings, widths, relative sizes of printed objects, or colors of printed objects to decode binary or textual data encoded in the barcode, which binary or textual data may then be supplied to a processor or other device. Commercial barcode scanners use projected light to measure reflections, and therefore cannot read barcode data simply by sensing environmental light without the use of projected light. Further, commercial barcode scanners either discard or fail to measure graphical data other than the reflected graphical barcode components. Yet further, commercial barcode scanners do not record graphical (as opposed to decoded binary or textual) data in electronic memory.

Summary

According to various embodiments, a computer-implemented method of obtaining compartmentalized authenticated access to a feature on an electronic mobile device including a camera is disclosed. The method includes obtaining data representing a printable authentication pattern, where the printable authentication pattern encodes access information; storing in electronic persistent memory the access information in association with data representing the feature; receiving, at the mobile telephone, a user request to access the feature; capturing, using a camera of the mobile device, an image of an input pattern printed on to a substrate; decoding the input pattern to obtain captured information; determining, by retrieving the access information, that the captured information matches the access information; and providing access to the feature on the mobile device as a consequence of at least the determining.

Various optional features of the above embodiments include the following. The printable authentication pattern may include a QR code. The method may include sending the access information to a remote server, where the obtaining includes obtaining, by the mobile device and from the remote server, the data representing the printable authentication pattern. The obtaining may include generating, within the mobile device, the data representing the printable authentication pattern. The storing may include storing in electronic persistent memory of a remote server the data representing the access information in association with the data representing the feature. The feature may include at least one of: privilege elevation, access to containerized data, and access to at least one application. The feature may include privilege elevation, and where the privilege elevation includes elevation to administrative privileges for an operating system of the mobile device. The feature may include access to at least one application, and where the at least one application includes a virtual private network application. The method may include obtaining a password; and verifying legitimacy of the password; where the providing access may include providing access to the feature on the mobile telephone as a consequence of both the determining and the verifying. The method may include obtaining data representing multiple printable authentication patterns, each of the multiple authentication patterns for accessing a different set of mobile device features.

According to various embodiments, a system for obtaining compartmentalized authenticated access to a feature on an electronic mobile device including a camera, the system including a mobile device and at least one remote server, is disclosed. The system includes at least one of the mobile device and the remote server is configured to obtain data representing a printable authentication pattern, where the printable authentication pattern encodes access information; at least one of the mobile device and the remote server is configured to store in electronic persistent memory the access information in association with data representing the feature; the mobile device is configured to receive a user request to access the feature; the mobile device is configured to capture, using the camera of the mobile device, an image of an input pattern printed on to a substrate; at least one of the mobile device and the remote server is configured to decode the input pattern to obtain captured information; at least one of the mobile device and the remote server is configured to determine, by retrieving the access information, that the captured information matches the access information; and the mobile device is configured to provide access to the feature on the mobile device as a consequence of at least a determination of a match.

Various optional features of the above embodiments include the following. The printable authentication pattern may include a QR code. The mobile device may be configured to obtain from the remote server the data representing the printable authentication pattern. The mobile device may be configured to generate, within the mobile device, the data representing the printable authentication pattern. The remote server may be configured to store in electronic persistent memory the data representing the access information in association with the data representing the feature. The feature may include at least one of: privilege elevation, access to containerized data, and access to at least one application. The feature may include privilege elevation, and where the privilege elevation may include elevation to administrative privileges for an operating system of the mobile device. The feature may include access to at least one application, and where the at least one application includes a virtual private network application. The mobile device may configured to obtain a password; at least one of the mobile device and the remote server may be configured to verify legitimacy of the password; and the mobile device may be configured to provide access to the feature on the mobile telephone as a consequence of a determination of a match and a verification of password legitimacy. At least one of the mobile device and the remote server may be configured to obtain data representing multiple printable authentication patterns, each of the multiple authentication patterns for accessing a different set of mobile device features.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

I. Introduction

In some embodiments, a mobile device may be configured by software to require a user to pass a multi-factor authentication process in order to access specific applications or data on a mobile device. The multi-factor authentication may utilize a barcode, such as a Quick Response (QR) code for image capture using digital camera componentry built into the mobile device, and another authentication factor, such as a password. The mobile device, and/or a remote server, analyzes the digital image of the barcode to decode the barcode into its encoded character data. If the character data and password are determined to be valid, then access to specified data and/or applications may be granted.

During initialization of the multi-factor authentication mechanism, the user may capture the image of an existing barcode (e.g., a drivers license barcode) as a valid authentication barcode, and may further specify a password associated with the barcode. Alternatively, the user may specify a text string, such as a user-chosen passphrase, as a valid character string that must be presented in the form of a barcode in order to satisfy an authentication factor. In either embodiment, the invention presents an advantage over traditional physical token-based security schemes in that the user may easily design, specify, generate, reproduce, or modify his or her preferred physical security token.

The invention is also preferable over traditional physical token-based security schemes and certain biometric security schemes in that the physical token may be introduced as an additionally required authentication factor without the need for any additional hardware over that typically provided with commercially available mobile devices, such as smartphones. The invention is further preferable over biometric authentication schemes that do not require special purpose hardware, such as some voice and speech recognition programs, in that, unlike voice and speech recognition software, the software required to detect and decode many standard barcodes, such as QR Codes, imposes considerably lower processor and memory burdens. The invention is further preferable over biometric authentication schemes in general in that decoding many standard barcodes is a considerably more straightforward operation than pairing detecting patterns in biometric data, is typically far less prone to producing false positives or false negatives, and is far less sensitive to environmental factors, such as lighting or minor graphical variations or imperfections. In fact, several standard barcode formats, such as QR Codes, have built-in error-correction mechanisms, thus further enhancing their reliability despite potential graphical imperfections.

Embodiments may be used to selectively grant access to data and/or applications. Such selective access is referred to herein as "compartmentalization". Compartmentalization may be employed in BYOD devices in order to protect private company data and applications from being compromised, e.g., when an employee loses or has stolen his or her mobile device. Other benefits and features will become apparent as the invention is described in detail in the following.

Figure 1:
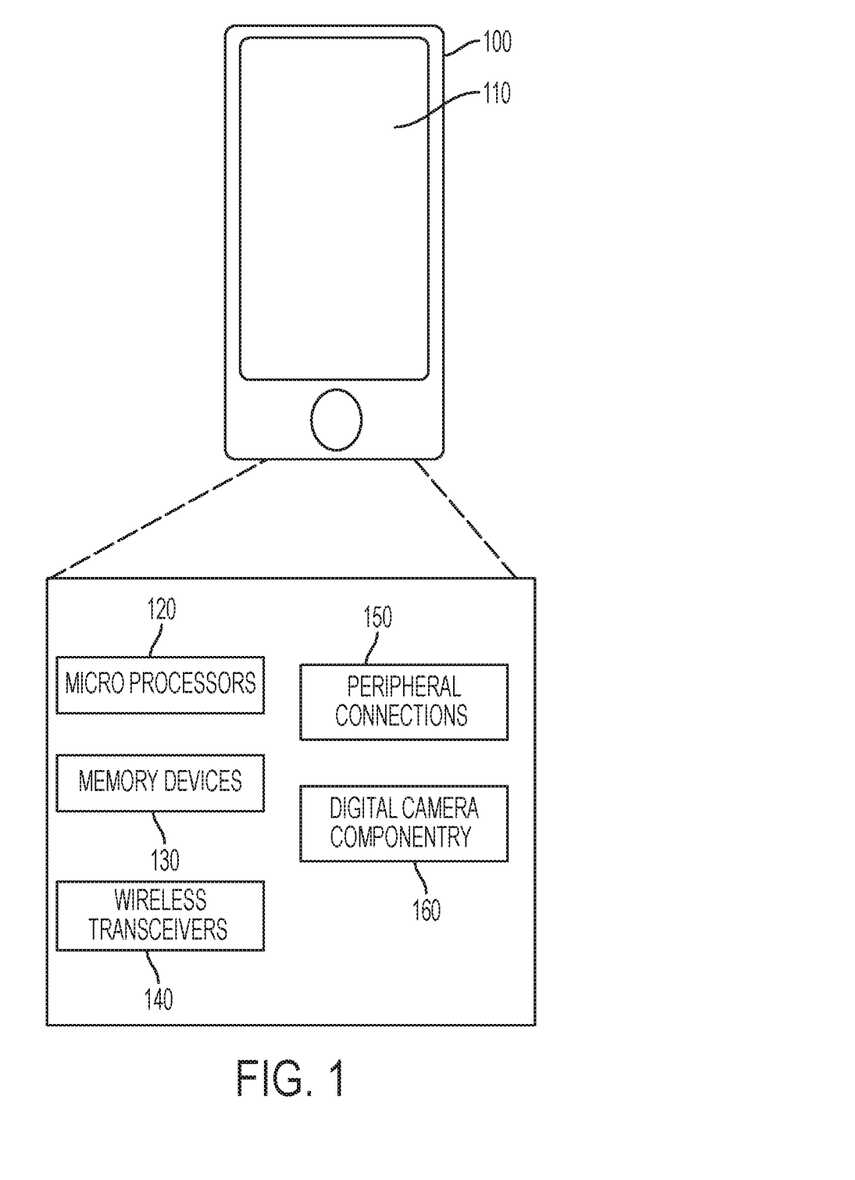
FIG. 1 is a schematic diagram of a mobile device according to some embodiments.

FIG. 1 is a schematic diagram of a mobile device according to some embodiments. Device 100 may be a mobile phone, a smartphone, a tablet, a smart watch, or another mobile computing device. As used herein, the term "handheld" device applies to smartphones, tablets, and smart watches, but not to laptop or desktop computers. Device 100 may be used to implement a compartmentalized multi-factor authentication scheme using image-captured barcodes, consistent with certain disclosed embodiments. Further, device 100 is not limited to handheld or mobile devices, but may comprise any computing device for which it may be desired to secure access using the multi-factor authentication techniques described herein.

Using the example of a mobile device, device 100 may comprise a display screen 110, such as a liquid crystal display (LCD), plasma, cathode-ray, pixel-based display, or other type of screen capable of rendering text or graphical data, such as a graphical user interface (GUI). Device 100 may additionally include, for example, one or more microprocessors 120 of varying core configurations and clock frequencies; one or more memory devices or computer-readable media 130 of varying physical dimensions and storage capacities, such as flash drives, hard drives, random access memory, etc., for storing data, such as images, files, and program instructions for execution by one or more microprocessors 120; one or more wireless transceivers 140 for communicating over wireless protocols, such as wireless Ethernet, code divisional multiple access (CDMA), time division multiple access (TDMA), etc.; one or more peripheral connections 150, such as universal serial bus (USB) connections or video interfaces; and one or more digital camera components 160 capable of capturing light information and converting the light information into digital images. Those skilled in the art will appreciate that the above-described componentry is exemplary only, as device 100 may comprise any type of hardware componentry, including any necessary accompanying firmware or software, for performing the disclosed embodiments.

Digital camera componentry 160 of mobile device 100 may be used to capture the image of a barcode in a manner that is distinguished from conventional special-purpose barcode scanners. In particular, digital camera componentry 160 may capture the graphical data of a barcode by simply taking a digital picture in the same manner as it would take a digital picture of any other object that a user could choose to take a picture of using digital camera componentry 160. Digital camera componentry 160 could then store the captured image as binary data, such as an image file. Processors 120 may then analyze the image file using standard image analysis techniques to detect the presence of a particular kind of barcode, such as a QR Code, and may then decode the barcode into binary or textual data using standard barcode decoding techniques.

In contrast, commercially available barcode scanners are specially designed for scanning barcodes. Such barcode scanners may be configured to project laser light onto a physical surface (on which is printed a barcode) in order to analyze the light as it is reflected off of the physical surface back into optical sensors resident in the barcode scanner. Hardware in the barcode scanner may analyze the reflected light to measure spacings, widths, relative sizes of printed objects, or colors of printed objects to decode binary or textual data encoded in the barcode, which binary or textual data may then be supplied to a processor or other device. Such special-purpose barcode hardware may be distinguished from camera componentry 160 by any one of: its use of projected light to measure reflections, its inability to read barcode data simply by sensing environmental light without the use of projected light, its discarding of or its failure to measure any graphical data other than the reflected graphical barcode components, its failure to record graphical (as opposed to decoded binary or textual) data in memory, and its nature as special purpose hardware that is not found in typical general purpose, end-user computing devices, such as personal computers, mobile telephones, or smartphones.

In some embodiments, therefore, digital camera componentry 160 may differ from a commercial dedicated-use barcode scanner by any one of: its ability to capture barcode data simply from sensing of environmental light without the necessary use of projected light (not including a flash bulb which may be used simply to enhance captured light) to detect the barcode, its capturing of all graphical data within view (other than solely the barcode components), its detection, isolation, and analysis of the barcode after all viewable imagery has been stored in digital image form (e.g., GIF, JPEG, bitmap, etc.) in memory, and its general purpose nature as standard digital camera componentry that may be found in typical general purpose, end-user computing devices, such as personal computer, mobile telephones, or smartphones, that is intended for general digital photography, as opposed to special-purpose barcode scanning.

Figure 2:
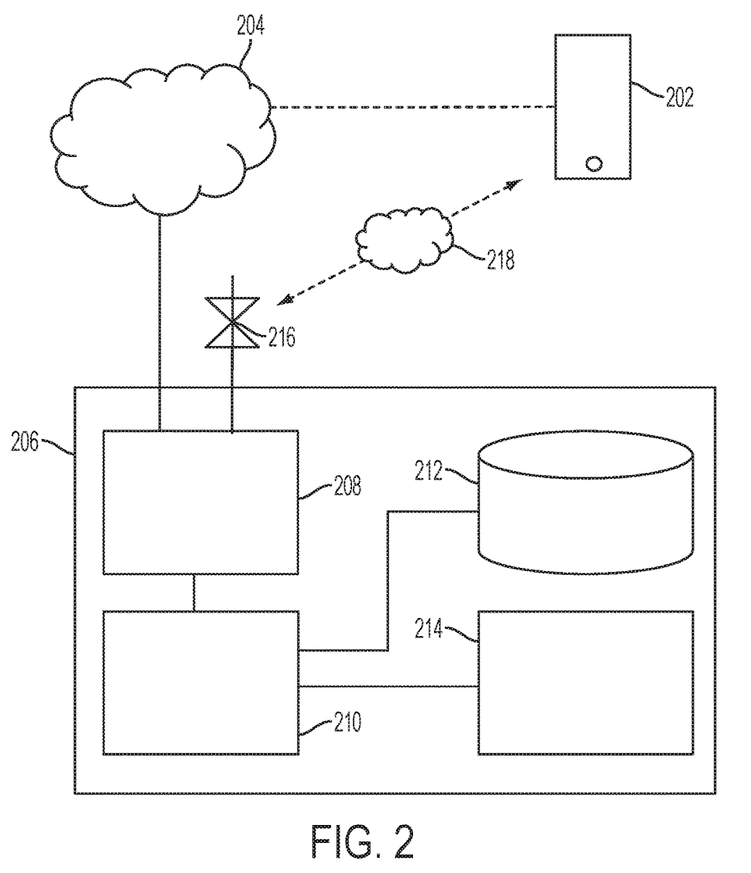
FIG. 2 depicts a remote server and its context according to some embodiments.

FIG. 2 depicts a remote server and its context according to some embodiments. Remote server 206 may be a specially-configured hardware device designed to provide services as disclosed herein. Remote server may be implemented partially or completely using rack-mounted electronic server hardware equipment, for example. Remote server may be situated in a location remote to a location of a mobile device according to embodiments of the invention. Remote server 206 may include or be communicatively coupled to network interface 208.

Network interface 208 may permit remote server 206 to communicate with one or more mobile devices 202. Therefore, network interface 208 may include a network interface to a hard-wired network 204 such as the internet, and/or to a wireless network, or to hybrid wireline/wireless network 218, such as a network including or consisting of a cellular telephone network. To that end, network interface 208 may include or be coupled to antenna 206.

Remote server 206 also includes one or more electronic processors 210. Electronic processors 210 may include one or more processing cores. Electronic processors may be communicatively coupled to network interface 208, to persistent storage 216, and to authentication server 214. Persistent storage may store program instructions which when executed by processors 210 and/or one or more electronic processors of authentication server 214, configure such components to perform the techniques disclosed herein.

II. Compartmentalized Multi-Factor Authentication Set-Up

Figure 3:
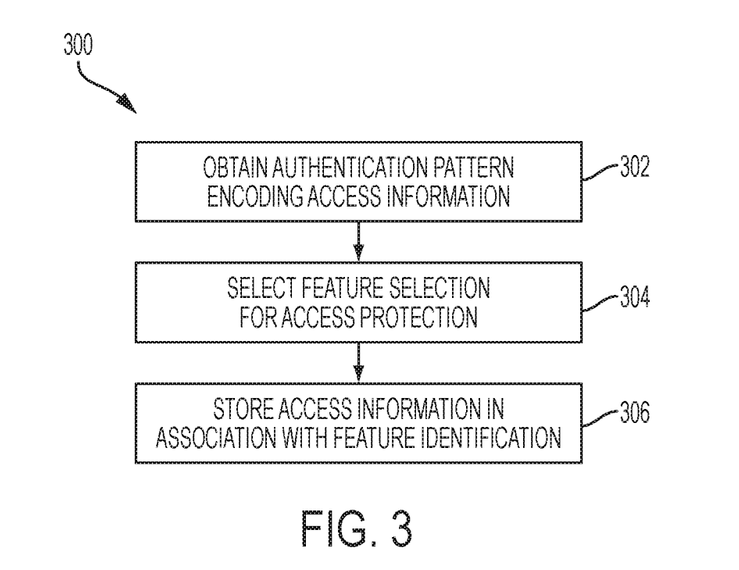
FIG. 3 is a workflow depicting an authentication set-up method 300 according to some embodiments.

FIG. 3 is a workflow depicting an authentication set-up method 300 according to some embodiments. Method 300 may be implemented in whole or in part by a mobile device (e.g., device 100 of FIG. 1) and/or by a remote server (e.g., remote server 206 of FIG. 2), as described herein. The set-up method may be used to establish both a barcode to be used as an authentication factor as part of a compartmentalized multi-factor authentication, and the data and/or applications that are to be protected by such multi-factor authentication. The set-up method may also be used to establish another factor in the multi-factor authentication, such as a password.

At block 302, method 300 obtains data representing a printable pattern encoding access information. The image may be in any of a variety of formats, e.g., bitmap, GIF, JPEG, etc. The pattern may be originally obtained in electronic format, e.g., as generated or as received via electronic transmission. Alternately, the pattern image may be obtained by capturing an image of a barcode printed on a physical substrate (e.g., paper or plastic cardstock). The mobile device's camera may be used to capture such an image.

In general, the pattern in electronic format may be obtained by either the mobile device or the remote server. For example, either the mobile device or the remote server may automatically produce access information and encode it into a barcode, thereby obtaining an image of such a barcode. Such access information may be any of a variety of types. For example, the access information generated by the mobile device or remote server may be or include a random number or pseudorandom number, a derivation of a username such as a cryptographic hash thereof, or other information.

Alternately, or in addition, according to some embodiments, the mobile device or remote server may allow a user to provide access information in the form of an arbitrary string of textual characters entered into a textbox or other GUI component. For example, the user may enter access information, such as, "twas brillig and the slithy toves did gyre and gimble in the wabe", which the remote server or mobile device may encode into a barcode such as a QR Code. The remote server may have an associated webpage that permits such information entry, for example. Alternately, or in addition, the mobile device may accept such information via direct input at a graphical user interface, for example.

The mobile device or remote server may provide various options for enabling the user to print out a copy of any generated or produced barcode, such as providing an option for emailing the barcode (e.g., in image file form) to an email address associated with the user, connecting to a printer to print the barcode, or transmitting the barcode to an authorized party for printing or embodying in a security object, such as a duly issued company badge or identification card.

Alternately, in some embodiments, the mobile device's camera obtains an electronic image of a pre-existing barcode. The user may utilize any barcode from any existing objects within the user's dominion. For example, the user may use a barcode present on the user's state-issued driver's license. As another example, the user may use a barcode of any identification or commercial card typically carried by the user. So-called rewards cards from grocery or other stores, by which a user obtains credit or benefits for use in a particular store, may be used. In general, any surface bearing a barcode may be obtained by being imaged by the camera of the mobile device. Note that according to these embodiments, the user may not know the access information encoded in the barcode.

At block 304, method 300 selects one or more mobile device features for compartmentalized access protection. Note that either the user or an administrator may select such features. The selection may occur at the mobile device or at the remote server. The selection may be made using a graphical user interface on the mobile device, or via a webpage associated with the remote server, for example.

Figure 4:
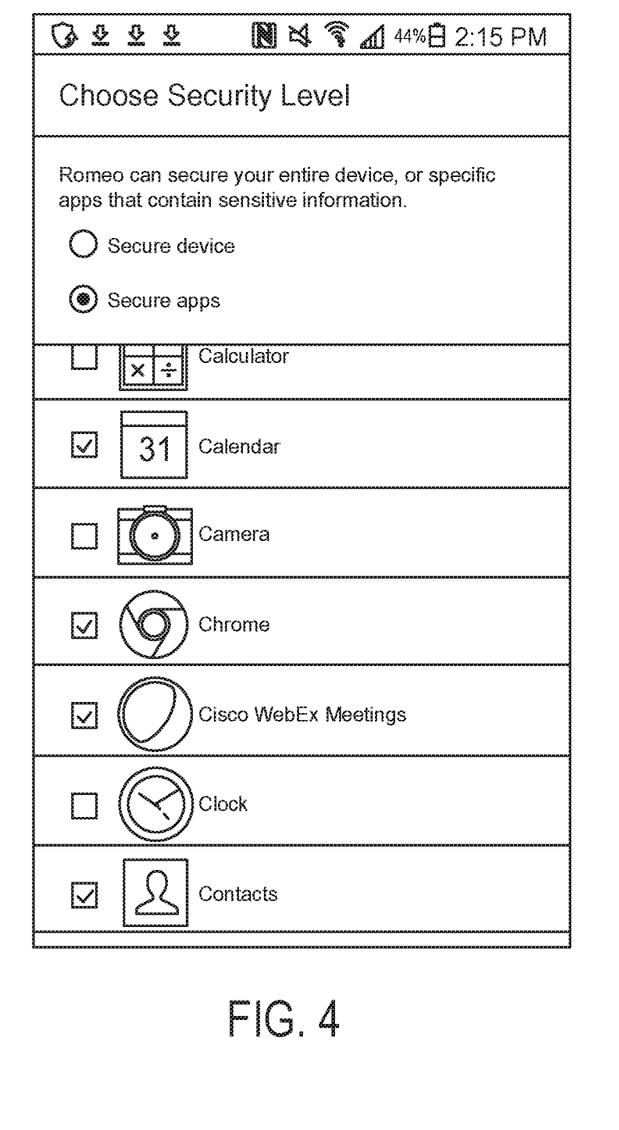
FIG. 4 is a screenshot of a graphical user interface present on a mobile device and configured to permit a user to select one or more features for compartmentalized multi-factor access protection according to some embodiments.

FIG. 4 is a screenshot of a graphical user interface present on a mobile device and configured to permit a user to select one or more features for compartmentalized multi-factor access protection according to some embodiments. Such an interface may be used for block 304 of method 300. As shown, the graphical user interface allows a user to select one or more applications on the mobile device for protection by placing virtual check marks in the respective fields. Suitable applications include, for example, calculator, calendar (including appointments, meetings, etc.), camera, browser, webex, clock, contacts, virtual private network, email, telephone, etc.

Note that the selection may include an identification of one or more data stores present on the mobile device. Such data stores may be selected, by either a user of the remote device or an administrator or automated process of the remote server, by providing an indication of a system file path, for example. Alternately, or in addition, such data may be selected by way of a graphical user interface such as a file manager (e.g., APPLE's FINDER, or MICROFT's WINDOWS EXPLORER).

The selection information of block 304 may be conveyed from the remote server to the mobile device, or from the mobile device to the remote server.

At block 306, method 300 stores the access information in association with data indicating the features selected at block 304. The information and data may be stored at the remote server (e.g., in persistent memory 212) or at the mobile device (e.g., in memory devices 130). Whether at the remote server or the mobile device, the access information and data representing the feature may be stored in a row in a database table, for example, with separate columns for the access information and the data identifying the feature. If stored at the remote server, such a database table may further include a column for mobile device user identification and/or password, the latter of which may be stored encrypted or after having been subjected to cryptographic hash. For the mobile device in particular, the access information may be associated with the data representing the feature by storing these data in dedicated identified memory locations. In general, either or both of the access information and feature identification data may be stored in encrypted form or after having subjected to a cryptographic hash.

Note that rather than storing the pattern itself, some embodiments instead store the access information that is encoded in the pattern. That is, some embodiments store an association between the identified feature(s) and the binary or textual data of the barcode (i.e., the access information) in memory, rather than the barcode itself. In another embodiment, the graphical image could be an image that does not decode into binary or textual data. In such an embodiment, the mobile device may instead store a copy of the image itself in memory. When the user later captures the image as part of an authentication operation, the mobile device may determine whether the captured image matches the stored image using standard image comparison techniques, as known to those skilled in the art.

This concludes the description of method 300.

Figure 5:
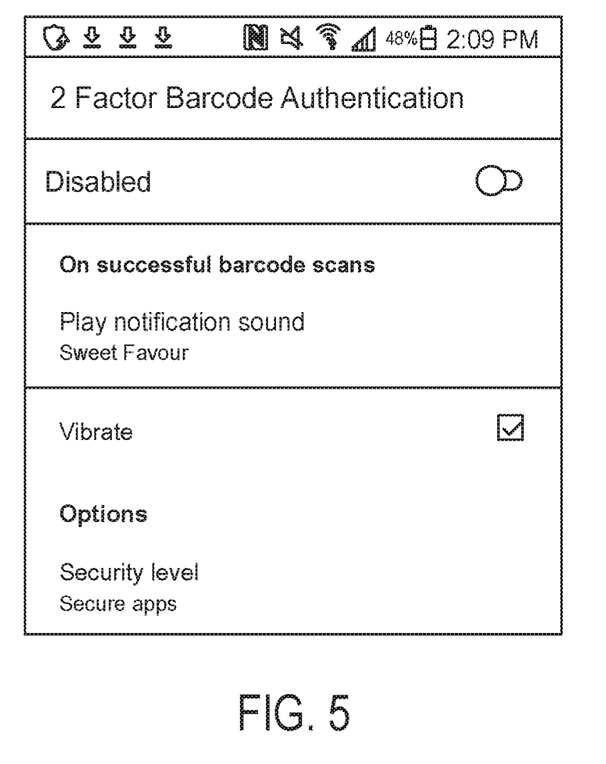
FIG. 5 is a screenshot of a graphical user interface for enabling compartmentalized multi-factor authentication on a mobile device according to some embodiments.

FIG. 5 is a screenshot of a graphical user interface for enabling compartmentalized multi-factor authentication on a mobile device according to some embodiments. This interface may be used to enable a compartmentalized multi-factor authentication scheme set up according to method 300. The interface includes a switch for enabling/disabling such authentication. Note that according to some embodiments, the switch may be inoperable by a user unless, e.g., that user has administrative privileges. In some embodiments, the user can enable but not disable such authentication. In some embodiments, the user cannot enable or disable such authentication, but an administrator or automated process of the remote server may send a signal to the mobile device enabling or disabling the authentication.

III. Compartmentalized Multi-Factor Authentication Usage

Figure 6:
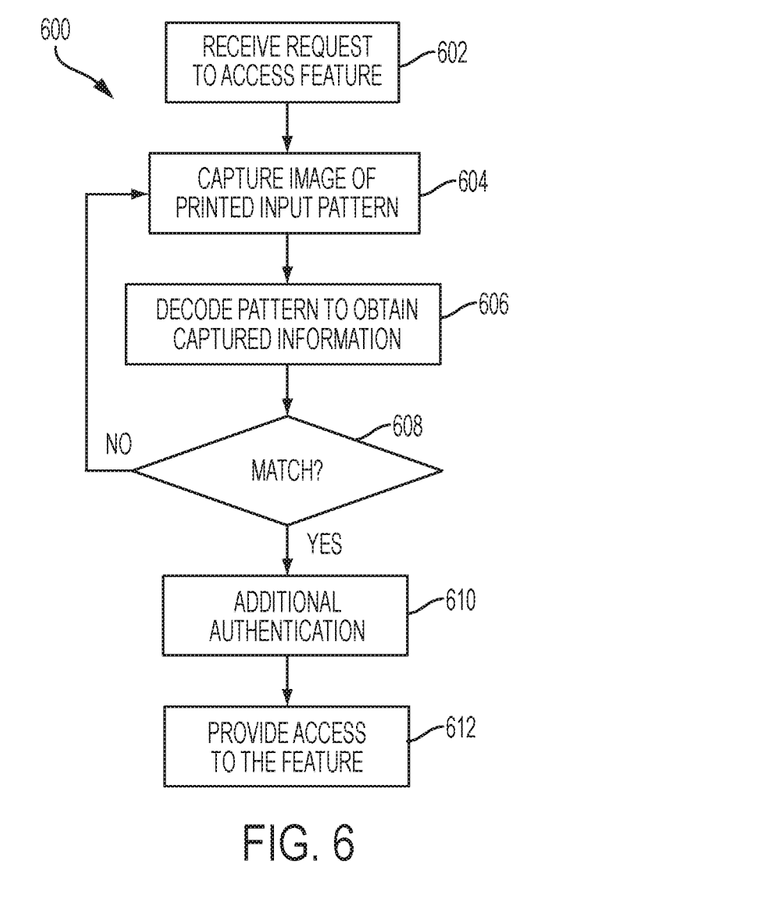
FIG. 6 is a flowchart depicting a compartmentalized multi-factor authentication method 600 according to some embodiments.

FIG. 6 is a flowchart depicting a compartmentalized multi-factor authentication method 600 according to some embodiments. The authentication may have been previously set up using a set-up method such as set up-method 300 of FIG. 3. Method 600 may be implemented in whole or in part by a mobile device (e.g., device 100 of FIG. 1) and/or by a remote server (e.g., remote server 206 of FIG. 2). Method 600 may be used to perform a compartmentalized multi-factor authentication in order to access applications, data, or other features on the mobile device.

At block 602, method 600 receives a request to access a feature of the mobile device. The request may have been initiated by a user of the mobile device, e.g., by clicking on, tapping, or otherwise attempting to execute or access the feature in a standard manner. Instead of automatically launching, executing, or opening the feature in response to the access attempt, however, the mobile device instead initiates a multi-factor authentication scheme for the protected feature.

This initiation may include displaying a screen or pop-up that informs the user that access to the requested feature is contingent upon successfully completing a multi-factor authentication. It may inform the user that it is necessary to capture an image of a valid graphical image, such as a barcode, using digital camera componentry 160, in order to gain access. The information may be presented so as to provide the user with an option (e.g., a graphical button) for cancelling the request, which, upon activation, returns the user to the home mobile device screen. The mobile device may additionally may provide a capture area that displays whatever physical objects are currently within the view of digital camera componentry 160 in order to enable the user to know when an input pattern is ready for capture. Once the user can see that the entire input pattern is displayed within the capture area, the user may press or activate a physical or GUI control, such as a virtual button, to instruct the mobile device to capture and store a digital image. In other embodiments, digital camera componentry 160 may automatically capture a digital image of the input pattern once it is determined that all of the pattern is within view and capable of capture and decoding.

At block 604, method 600 captures an image of a printed input pattern. The printed input pattern may be a barcode printed on a substrate such a paper, paper cardstock, or plastic cardstock, for example. Users attempting to gain access to protected feature(s) may user the remote device to capture an image of a printed copy of the barcode obtained per set-up method 300 of FIG. 3, for example. The printed input pattern may be present on a preexisting user article, e.g., a state-issued driver's license.

Figure 7:
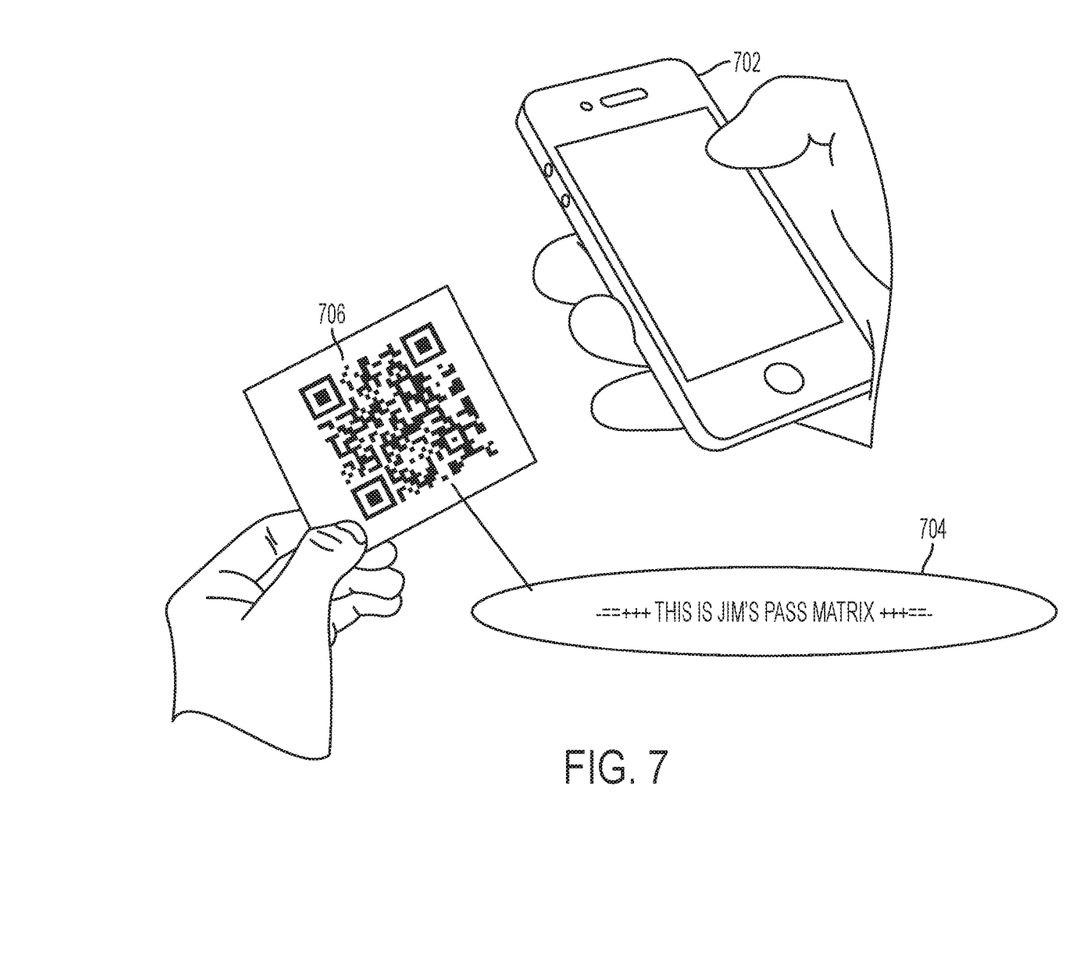
FIG. 7 depicts capturing an image of a barcode according to some embodiments.

FIG. 7 depicts capturing an image of a barcode according to some embodiments, e.g., as may occur per block 604 of method 600. Thus, FIG. 7 depicts a user's hand positioning printed QR code 706 such that a camera of smartphone 702 captures an image thereof. As depicted, QR code 706 encodes access information, "-+++++ This is Jim's pass matrix +++==-". This information may have been provided by the user, Jim, to his mobile device or to the remote server, either of which generated the associated QR code encoding Jim's selected access information, e.g., per block 302 of FIG. 3. Jim may have subsequently printed or otherwise obtained a physical copy of the QR code as printed on a substrate.

At block 606, method 600 decodes the image of the captured input pattern to obtain captured information. The decoding may be performed by either the mobile device or the remote server. For example, the mobile device may decode the captured image to obtain the captured information. Alternately, the mobile device may send the captured image to the remote server, e.g., via either network 204 or network 218, which may decode it to obtain the captured information. The decoding may be any standard decoding for the type of barcode represented by the captured input pattern. As shown in FIG. 7, for example, the captured information may be, "-+++++ This is Jim's pass matrix +++==-".

At block 608, method 600 determines whether the captured information matches the access information for the mobile device, the particular requested feature(s), and, for some embodiments, the user. The matching may occur at the mobile device or the remote server. The location at which the matching occurs may be dependent on where the access information is stored in association with an identification of the access-controlled feature(s) per block 306 of FIG. 3. The matching may utilize a test for equality, a string matching algorithm, or any other technique for determining whether two textual strings are identical.

If the captured information does not match the access information, block 608 may pass control back to block 604 for the user to attempt to capture an image of an appropriate input pattern. This may be accompanied by a display on the mobile device of a message to the user indicating that the authentication failed, and requesting that the user try again.

According to some embodiments, multiple (e.g., two, three, four, etc.) failed matching attempts at block 608 will cause the associated features of the mobile device to lock, e.g., the mobile device prevents any access to the associated feature(s) until the mobile device feature is unlocked. Unlocking the feature may require the user to contact an administrator at the remote server. To unlock the associated feature(s), the remote server may send an unlock message to the mobile device. The message may be encrypted and digitally signed, for example.

According to some embodiments, if the captured information does not match the access information, control passes to a different portion of method 600. For example, the process may simply terminate, and restart if another request to access a feature is received.

Otherwise, if the captured information matches the access information, control passes to block 610.

At block 610, method 600 performs additional authentication step(s). Note that in some embodiments, this block is optional. The additional authentication steps may include password authentication, for example. According to password authentication, the user may be prompted to enter a password, the mobile device may receive a password from the user, and the mobile device may determine whether the correct password has been entered, e.g., by subjecting the entered password to a cryptographic hash and comparing the result with a stored copy of a cryptographic hash of the correct password. The stored copy of the cryptographic hash of the correct password may be stored at the mobile device or at the remote server. If the comparison reveals that the passwords do not match, the method may re-prompt for the user to enter a password. After multiple (e.g., two, three, four, etc.) incorrect attempts, access to the requested feature(s) may be locked in the same manner as described above in reference to block 608. Otherwise, if the passwords match, control may pass to block 612. Alternately, block 610 may include additional authentication procedures.

That is, for some embodiments, rather than immediately granting the user access after entry of a valid password, the mobile device may subject the user to additional security requirements as part of a three-factor or n-factor authentication mechanism for n>3. For example, the mobile device could require the user to provide not only a password, but also a login name associated with the password. The mobile device could also require successful entry of a valid login name and password before prompting the user to capture the image of a valid input pattern associated with the login name or login/password pair.

At block 612, method 600 provides access to the requested feature. This may be accomplished by the operating system of the mobile device simply activating, opening, or executing the requested feature.

After providing access per block 612, method 600 may end.

IV. Example Variations and Alternatives

As noted, e.g., in reference to FIG. 2, the invention is also not limited to implementing the disclosed multi-factor authentication using a single mobile device, but may instead be implemented using various device combinations, such as a client-server architecture. In some embodiments, the mobile device may be linked with or managed by one or more remote servers with which it communicates using one or more wired or wireless protocols, see FIG. 2, for example. The mobile device may be part of a managed network of devices in a company or other organization. In such a network, a user may establish or modify security settings with respect to the mobile device using a centralized platform, such as a secure website associated with (or hosted by) remote server 206. The user may log into the secure website using login credentials, such as a username and password. There, the user may add or modify an authorization pattern and/or associated password needed to gain access to one or more features.

Such a centralized approach may provide several advantages over a multi-factor authentication scheme implemented entirely by a mobile device. For example, if a user loses a printout of an authentication pattern, the user may retrieve a copy for printing using the secure website. Or, if it is company policy to print authentication patterns only on official company badges, the secure website may enable the user to place a request for a replacement security badge that displays the authentication pattern. The secure website may also enable the user to change the authentication pattern, for example, allowing the user to input a text string for encoding in an authentication pattern or by automatically generating a new authentication pattern randomly or without user input.

Once a new authentication pattern has been established using the secure website, the mobile device may be configured to recognize the new authentication pattern as valid using a number of different techniques. In one embodiment, one or more servers, for example a server that serves webpages as part of the secure website, or remote server 206, may cause to be transmitted a remote instruction to the mobile device to inform it of the new authentication pattern. Such an instruction may be transmitted using, e.g., network 204 or network 218, and may additionally instruct the mobile device to no longer recognize one or more previously used patterns as valid. Using this approach, if a user loses a mobile device configured to implement multi-factor authentication techniques consistent with disclosed embodiments, the user may remotely configure the device to reject any current or previous authentication patterns (e.g., to prevent unauthorized access) despite not having physical access to the device that would permit manual configuration.

In another embodiment, a security server or server system (e.g., remote server 206) may have a public-private key pair. When a user requests a new authentication pattern from the security serve, the security server may first encrypt or digitally sign access information with its private key before encoding it in an authentication pattern, e.g., per block 302 of method 300. The mobile device may maintain a copy of the public key. When a user authenticates using such an authentication pattern, the mobile device may decode the authentication pattern to obtain encrypted access information and then decrypt the access information using the public key, e.g., per block 606 of method 600. If the access information successfully decrypts or, when decrypted, has certain properties, then the mobile device may determine that the authentication pattern is valid (e.g., per block 608 of method 600), despite not having that particular authentication pattern stored in memory, and despite not consulting the security server during the authentication process. The mobile device may determine that the authentication pattern is valid because it may be assumed that only a server having the corresponding private key (i.e., the security server) could have encrypted or digitally signed the access information of the authentication pattern presented by the user.

As another example, when a user requests a new authentication pattern from the security server, the security server may prompt the user to enter a password (equivalently: passphrase, passcode, etc.) associated with the new authentication pattern. Once the user supplies the password, the security server may encrypt the password with its private key, or may supply a digital signature associated with the password using its private key, which output may be encoded in the authentication pattern. When the user captures the image of the authentication pattern, device 100 may decrypt the access information or determine the validity of the digital signature using the public key. The mobile device may then prompt the user for the password associated with the authentication pattern. If the user-supplied password matches the decrypted access information or decrypted digital signature, then the mobile may recognize the authentication pattern/password combination as valid, despite having no prior memory or knowledge of either. These steps are example alternative implementations of all or portions of blocks 606, 608, and 610 of method 600, for example.

In some embodiments, the mobile device may rely on one or more remote devices (e.g., web servers) to determine whether a particular authentication pattern is valid, rather than storing a list of valid authentication patterns or access information in local memory. That is, the following is an example of implementing block 608 of method 600. After the mobile device has captured an image of an authentication pattern provided by the user, the mobile device may decode the authentication pattern to derive its access information, and may then send the access information to a remote authentication server (e.g., authentication server 214). The remote authentication server, which may store or have access to an authoritative list of valid access information for the device, may then transmit a response to the mobile device indicating whether the access information, and thus the authentication pattern, is valid. In this manner, a user may add, change, or delete the authentication pattern (s) associated with the mobile device entirely at a central authentication server or website without having to reconfigure or modify the mobile device.

The invention is also not limited to situations in which the mobile device is configured or programmed to recognize only one valid authentication pattern, password, or user. In some embodiments, the mobile device may be configured to recognize multiple, distinct authentication patterns as valid, each of which provides a different degree of access to data, programs, or functionalities provided by the mobile device. For example, a first user may desire to allow a second user to access her mobile device, but only under certain conditions. The first user may therefore configure the mobile device to recognize two different authentication patterns as valid. The mobile device may be configured to enable a user who authenticates with the first authentication pattern to gain full access to data, programs, or functionality provided by the device, but to enable a user who authenticates with the second authentication pattern to gain reduced access to data, programs, or functionality compared to the first authentication pattern. Alternatively or additionally, the second authentication pattern may provide access to a user for only a limited period of time. The first and the second authentication patterns may have different passwords or the same password associated with them. In other embodiments, the mobile device may be configured to associate two different passwords with a single authentication pattern, each password providing a different level of access to the authenticating user.

In more detail, for some embodiments, multiple authentication patterns may be associated with multiple sets of features for the same mobile device. The following examples may be implemented on the same mobile device. A first authentication pattern and first password may be associated with full access to the mobile device as a user, including access to all data and applications on the mobile device. A second authentication pattern and second password may be associated with administrative access to an operating system of the mobile device, including the ability to install, modify, and delete applications and data. A third authentication pattern and third password may be associated with execution of a virtual private network application present on the mobile device, e.g., a virtual private network to the user's employer's network. A fourth authentication pattern and fourth password may be associated with access to a data store on the mobile device. The data store may be in any format for storing data, e.g., textual, image, multimedia, etc. The data store may contain employer data. A fifth authentication pattern and fifth password may be associated with an employee email account, that is, an email account provided by the user's employer for work usage. (The user's person email account may be accessible without requiring authentication according to the invention in some embodiments.) A sixth authentication pattern and sixth password may be associated with an employee list of contacts, that is, contacts for the user's employee computer account. Each such contact may include a person's name, their email address, their phone number, and other information. The contacts may be associated with, or part of, the user's employee email account. A seventh authentication pattern and seventh password may be associated with a combination of items related to the mobile device user's employer. Such items may include, for example, any combination of: execution of a virtual private network to the employer's computer system, access to the user's employee email account, access to the user's employee list of contacts, and access to employer data present on the mobile device. In these examples, unless the user presents at least the associated authentication pattern, he or she will not be allowed to access or execute the associated items. According to some embodiments, the users must also input the associated password to gain access or execute the respective applications. According to other embodiments, presenting the associated authentication pattern is sufficient, such that the passwords are not needed; that is, some embodiments omit the passwords noted above. According to other embodiments, the passwords are required for access. According to some embodiments, all of the above-noted passwords are identical; according to other embodiments, each is unique, and, according to yet other embodiments, some passwords may be identical, e.g., work-related passwords such as the third, fourth, fifth, and sixth passwords may be identical. Further, work-related authentication patterns may be identical, e.g., the third, fourth, fifth, and sixth authentication patterns may be identical.

Although described primarily in the context of a handheld device, such as a mobile phone or smartphone, the foregoing embodiments are not limited to any particular device, but may also be applied to any device capable of performing the compartmentalized multi-factor authentication techniques described herein. For example, the foregoing embodiments may be practiced by a traditional desktop or laptop computer having digital camera functionality, whether such componentry is resident in the computer itself or is provided by a separately connected peripheral device. Although, for reasons described above, in some embodiments, the invention may have particular utility in devices that have digital camera componentry in native hardware support, such that the devices could be configured to perform the disclosed embodiments entirely by software upgrade.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations.

In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method of obtaining elevation to administrative privileges for an operating system of an electronic mobile device comprising a camera, the method comprising:
 obtaining data representing a printable authentication pattern, wherein the printable authentication pattern encodes access information;
 storing in electronic persistent memory the access information in association with data representing the elevation to administrative privileges;
 receiving, at the mobile telephone, a user request for elevation to administrative privileges;
 capturing, using a camera of the mobile device, an image of an input pattern printed on to a substrate;
 decoding the input pattern to obtain captured information;
 determining, by retrieving the access information, that the captured information matches the access information; and
 providing elevation to administrative privileges for an operating system of the mobile device as a consequence of at least the determining.

2. The method of claim 1, wherein the printable authentication pattern comprises a QR code.

3. The method of claim 1, further comprising sending the access information to a remote server, wherein the obtaining comprises obtaining, by the mobile device and from the remote server, the data representing the printable authentication pattern.

4. The method of claim 1, wherein the obtaining comprises generating, within the mobile device, the data representing the printable authentication pattern.

5. The method of claim 1, further comprising:
 obtaining a password; and
 verifying legitimacy of the password;
 wherein the providing access comprises providing access to the feature on the mobile telephone as a consequence of both the determining and the verifying.

6. The method of claim 1, further comprising obtaining data representing multiple printable authentication patterns, each of the multiple authentication patterns for accessing a different set of mobile device features.

7. A system for obtaining elevation to administrative privileges for an operating system of an electronic mobile device comprising a camera, the system comprising a mobile device and at least one remote server, wherein:
 at least one of the mobile device and the remote server is configured to obtain data representing a printable authentication pattern, wherein the printable authentication pattern encodes access information;
 at least one of the mobile device and the remote server is configured to store in electronic persistent memory the access information in association with data representing elevation to administrative privileges;
 the mobile device is configured to receive a user request for elevation to administrative privileges;
 the mobile device is configured to capture, using the camera of the mobile device, an image of an input pattern printed on to a substrate;
 at least one of the mobile device and the remote server is configured to decode the input pattern to obtain captured information;
 at least one of the mobile device and the remote server is configured to determine, by retrieving the access information, that the captured information matches the access information; and
 the mobile device is configured to provide elevation to administrative privileges as a consequence of at least a determination of a match.

8. The system of claim 7, wherein the printable authentication pattern comprises a QR code.

9. The system of claim 7, wherein the mobile device is configured to obtain from the remote server the data representing the printable authentication pattern.

10. The system of claim 7, wherein the mobile device is configured to generate, within the mobile device, the data representing the printable authentication pattern.

11. The system of claim 7, wherein:
 the mobile device is configured to obtain a password;
 at least one of the mobile device and the remote server is configured to verify legitimacy of the password; and
 the mobile device is configured to provide access to the feature on the mobile telephone as a consequence of a determination of a match and a verification of password legitimacy.

12. The system of claim 7, wherein at least one of the mobile device and the remote server is configured to obtain data representing multiple printable authentication patterns, each of the multiple authentication patterns for accessing a different set of mobile device features.

* * * * *